United States Patent [19]

Merz

[11] Patent Number: 4,966,527

[45] Date of Patent: Oct. 30, 1990

[54] COMPOSITE BLADE CONSTRUCTION FOR A PROPELLER OR ROTOR BLADE

[75] Inventor: Herbert Merz, Munich, Fed. Rep. of Germany

[73] Assignee: MTU Motoren-und Turbinen-Union Muenchen GmbH, Munich, Fed. Rep. of Germany

[21] Appl. No.: 389,333

[22] Filed: Aug. 3, 1989

[30] Foreign Application Priority Data

Aug. 3, 1988 [DE] Fed. Rep. of Germany ....... 3826378

[51] Int. Cl.$^5$ .......................... F01D 5/14; F01D 5/30
[52] U.S. Cl. .............................. 416/241 R; 416/230; 416/271 A
[58] Field of Search ............... 416/229 R, 229 A, 230, 416/244 A, 239, 217, 234, 248, 241 A, 204 R, 204 A, 214 R, 220 R, 220 A, 223 R, 223 A, 224

[56] References Cited

U.S. PATENT DOCUMENTS

| | | | |
|---|---|---|---|
| 2,919,889 | 1/1960 | Rubel | 416/230 |
| 3,027,138 | 3/1962 | Howell et al. | 416/220 R |
| 3,310,116 | 3/1967 | Saeki et al. | 416/224 |
| 3,737,250 | 6/1973 | Pilpel et al. | 416/248 |
| 3,883,267 | 5/1975 | Baudier et al. | 416/230 |
| 4,268,571 | 5/1981 | McCarthy | 416/230 |
| 4,417,854 | 11/1983 | Cain et al. | 416/219 R |
| 4,810,167 | 3/1989 | Spoltman et al. | 416/241 A |

FOREIGN PATENT DOCUMENTS

249847 10/1966 Austria .
672645 2/1939 Fed. Rep. of Germany .
1628286 8/1970 Fed. Rep. of Germany .
2832098 1/1980 Fed. Rep. of Germany .

OTHER PUBLICATIONS

"Composite Propellers, Some Pros and Cons", in the Magazine Entitled *Aerospace Engineering*, May, 1986.
Aviation Week & Space Technology, Apr. 13, 1987, pp. 52–67 and 90–93, pp. 78–79.

*Primary Examiner*—Edward K. Look
*Assistant Examiner*—Hoang Nguyen
*Attorney, Agent, or Firm*—W. G. Fasse; D. H. Kane, Jr.

[57] ABSTRACT

A composite propeller blade construction has fiber strands extending predominantly in a radial direction and looping around mounting hardware connecting a blade root to a rotor hub. The mounting hardware includes at least one bolt secured to the rotor hub or a shackle member secured to the hub by a mounting bolt and holding a tying bolt so that fiber strand loops forming the blade body loop around the shackle member and around free ends of the tying bolt. The radially extending fiber strands take up centrifugal forces and are enclosed by a jacket, the radially inner end of which is formed as mounting flanges screwed to a respective rim of the hub. The arrangement of the fiber loops is especially suitable for a fiber composite lightweight construction wherein the fibers form redundant load take-up paths and provide an advantageous centrifugal force and moment introduction into the structure.

21 Claims, 6 Drawing Sheets

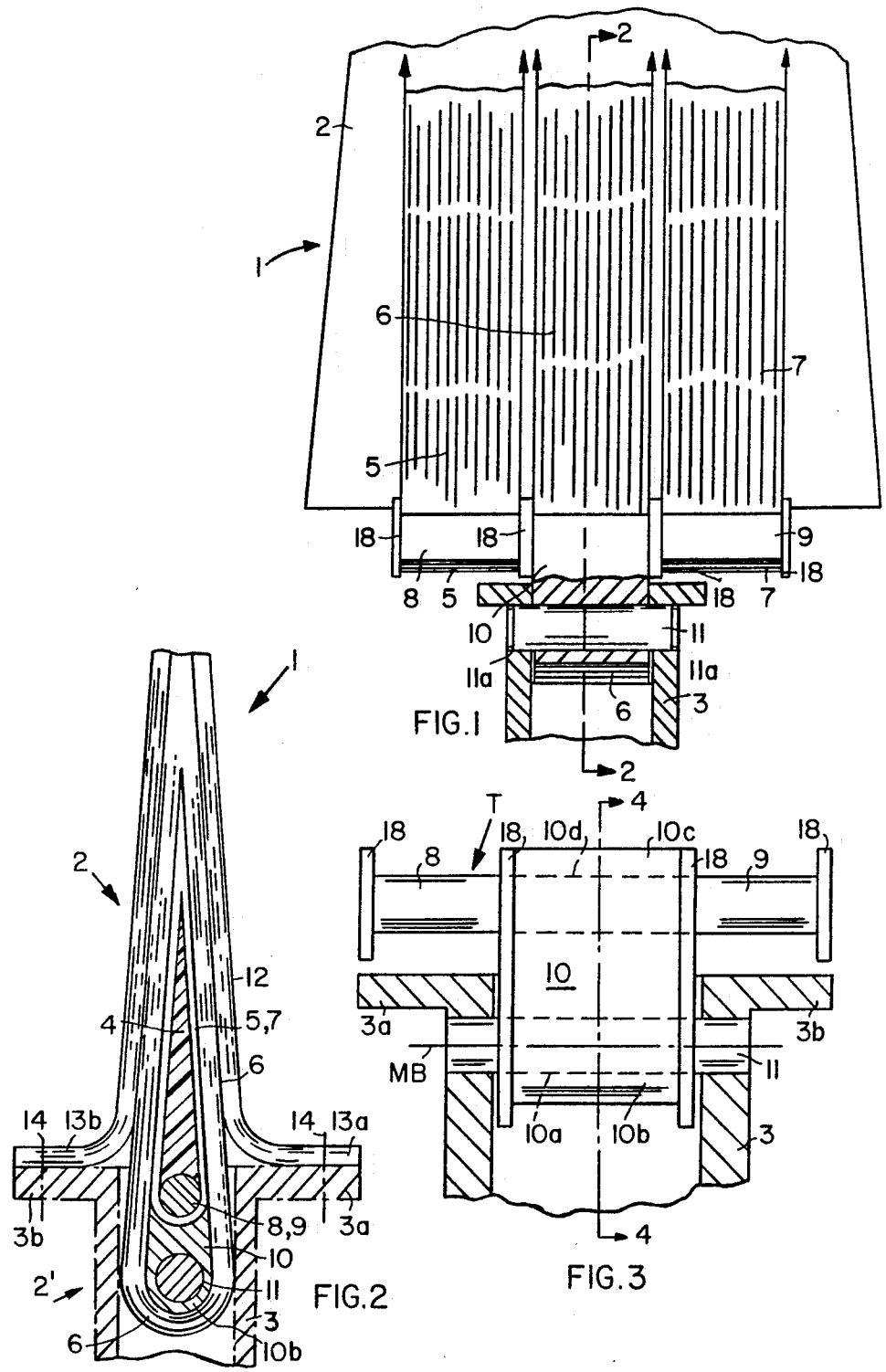

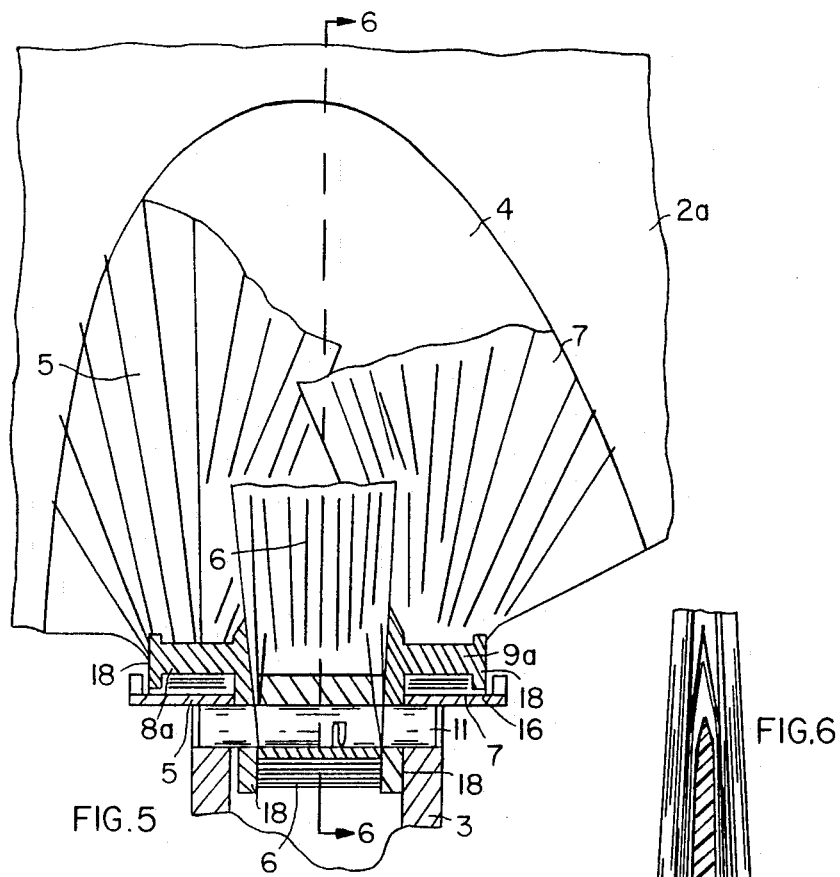
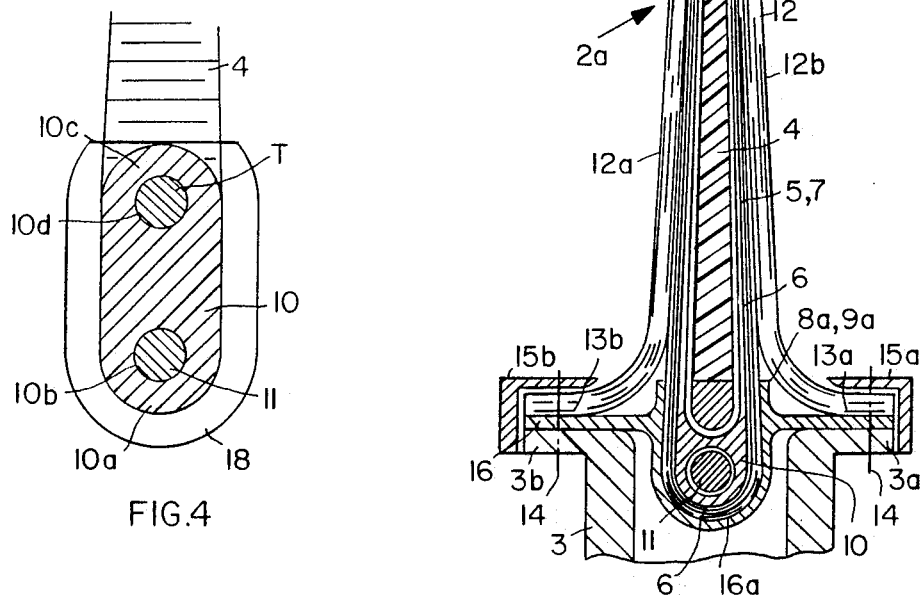

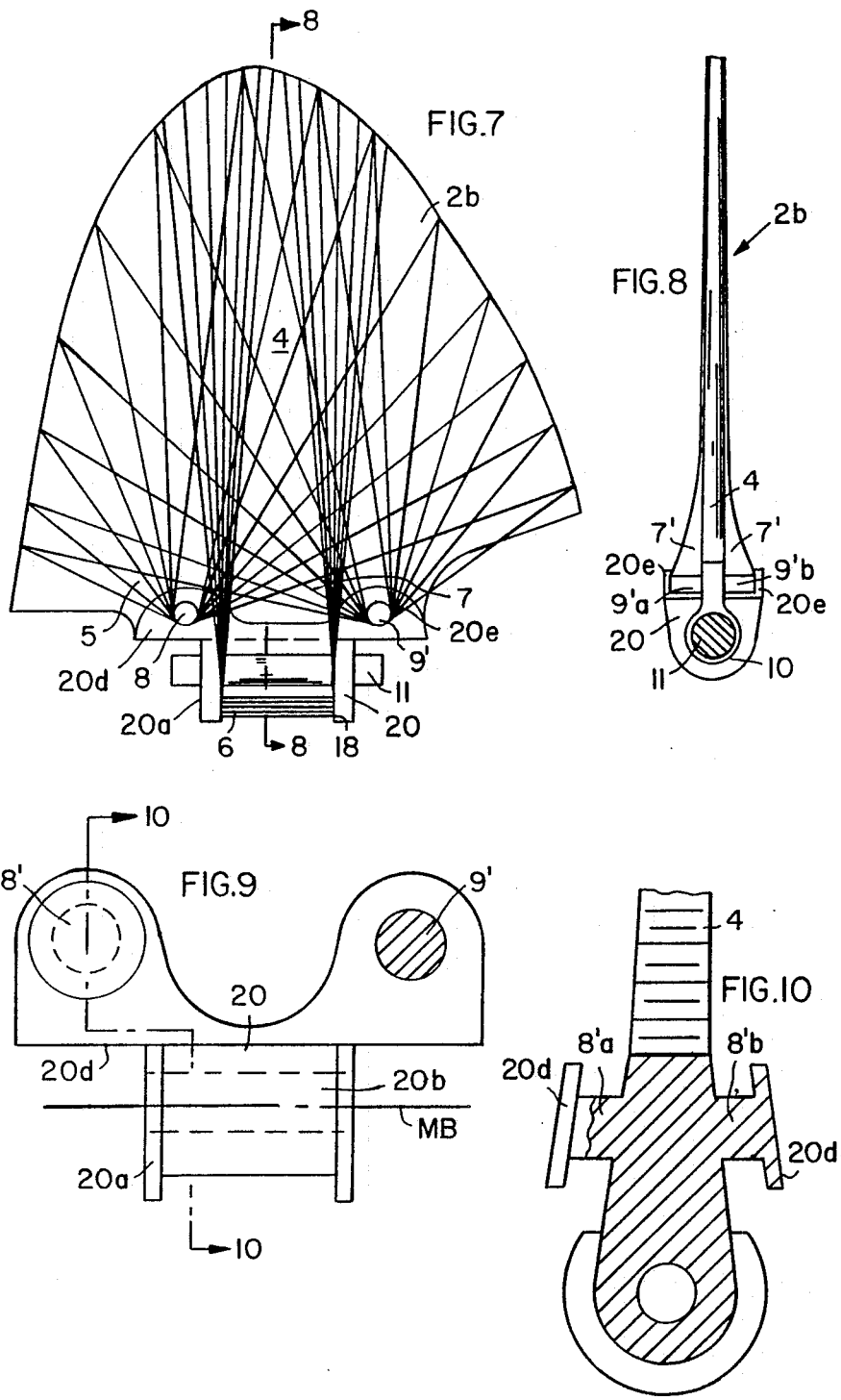

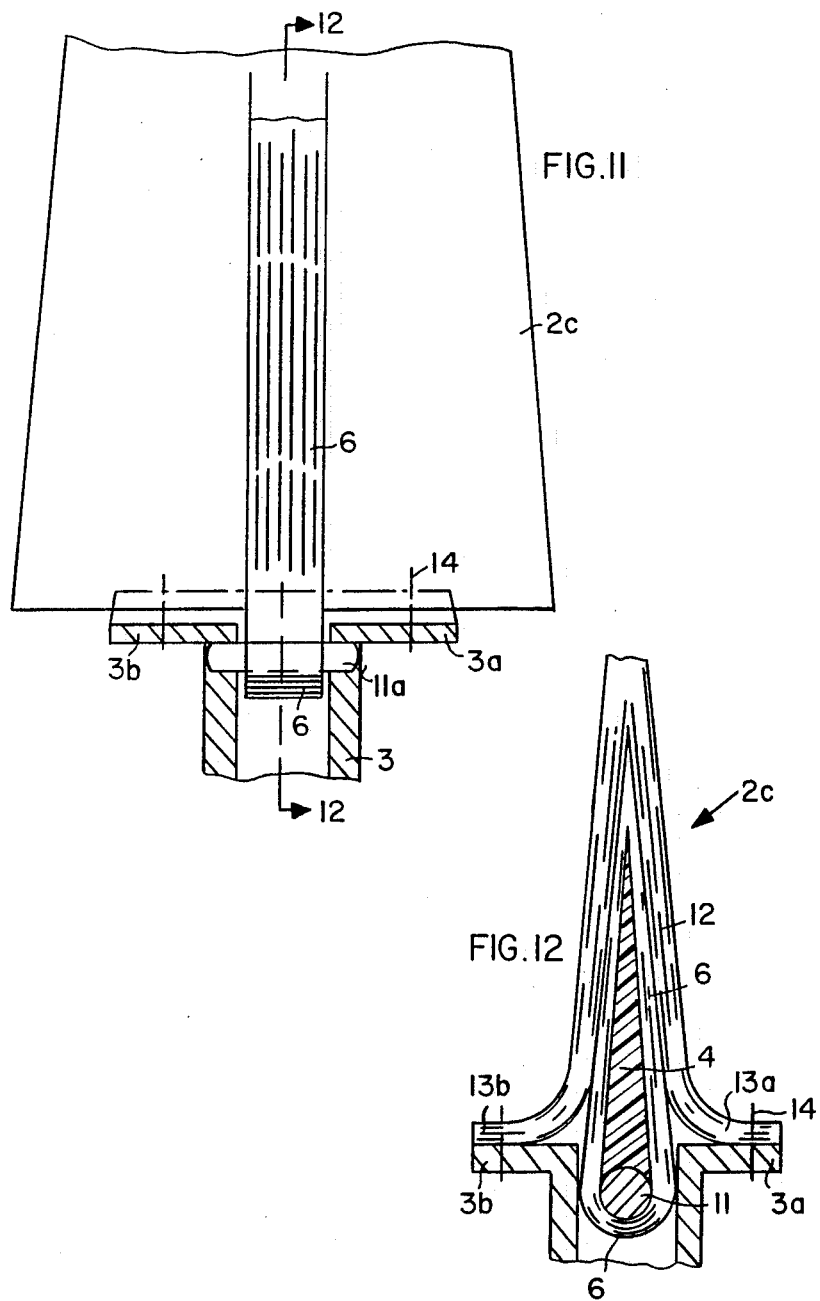

COMPOSITE BLADE CONSTRUCTION FOR A PROPELLER OR ROTOR BLADE

FIELD OF THE INVENTION

The invention relates to a composite blade construction suitable for use as a propeller blade or as a rotor blade. These blades are constructed of fiber reinforced synthetic material referred to as fiber composite material or simply as composite material.

BACKGROUND INFORMATION

In such blades, the reinforcing fiber strands extend substantially in radial directions, whereby the fiber composite material encloses a blade core and the fiber strands loop around a shackle member which secures the blade proper to a rotor. German Patent Publication (DE-OS) No. 1,628,286 discloses an axial blower vane or blade which is secured in a bore of a radially extending shaft which in turn is secured to the rotor. This known mounting permits an angular movement of the blade or vane as the rotor rotates in a horizontal plane. The purpose of the free angular movement is to enable the blade or blades to align themselves in the centrifugal force field in such a way that they are not exposed to any bending loads and hence are not subject to any bending stress. Thus, the known construction does not use any flange for taking up bending moments. That type of construction is not suitable for propeller blades which are intended to provide propulsion because the known blade mounting permits the blades to tilt in response to a shearing force caused by the gas flow. Such tilting is undersirable for propulsion propellers because it results in unbalances or flutter vibrations of the propeller.

It is, however, desirable that the blades for modern propulsion plants having a high bypass ratio are constructed as much as possible of fiber composite material because contrary to all-metal blades, this type of construction results in a desired weight reduction and renders the adjustment (tailoring) of the blade's critical vibration modes and frequencies in order to avoid meeting the harmonic vibration orders of the propulsion engine, i.e. critical resonances. Such blades must be mounted to the rotor in a manner stiff against stiff manner to bending but torsionally adjustable. Particularly, prop-fan blades may be advantageously constructed in this manner. However, constructing such blades of fiber composite material poses its own problems due to the high centrifugal forces which cause respective stress in the blades and particularly in the blade roots. The shearing forces caused by the aerodynamic gas flow add to the problems. These problems are aggravated if one has to take into account that foreign objects may enter such a prop-fan propulsion plant, for example, birds may be sucked into such a propulsion plant of an aircraft, whereby these foreign objects impact on the rotor blades. Such impacts cause high bending loads and respective stresses which cannot be taken up by the above known composite propeller blades and by the mounting mechanisms which secure these conventional propeller blades to the rotor.

Austrian Patent (AU-PS) No. 249,847 describes a mechanism in which a rotor blade is secured to a rotor hub by means of a foot plate through which a number of screw bolts extend which are subject to tension stress. This type of arrangement has the disadvantage that the centrifugal and bending forces can be taken up only by the bending of the foot plate flanges. Any additional bending and torsion moments that may occur upon impact of a foreign body, must also be taken up by the same screw bolts.

In this context the fiber composite materials have the disadvantage that due to weak laminar interfaces they tend to delaminate in response to bending loads. Further, the cross-sectional area for taking up loads is small where the mounting screws are located, thus the load transfer and respective stress is concentrated substantially in a point, whereby the screws are exposed to tension stress while the composite material is exposed to compression stress transverse to the fibers. Such stress application is disadvantageous with regard to the abilities of the respective materials. The composite material is capable of taking up longitudiual tension stress but not so capable of taking up transverse compression stress. As an overall result, delamination due to low cycle fatigue and due to high cycle fatigue does occur. In case the mounting fails, the respective blade which is subject to a centrifugal force of more than 15 tons, is thrown off. Thus, heavy weight burst protection features must be employed in the housings of such conventional rotors or in the airframe in order to avoid catastrophic damages.

Another conventional construction is described in an article entitled "Composite Propellers, Some Pros and Cons" in the magazine "Aerospace Engineering", May 1986. The mounting described in the article secures the propeller blade to the hub by means of a clamping mechanism. In this known system both the centrifugal forces and the bending moments are transmitted through the same force retention element in the form of a shearing load applied to the laminations of the composite material. In other words, the resin of the matrix material is primarily subjected to the transmitted stress while the fibers remain relatively unstressed.

German Patent (DE-PS) No. 672,645 discloses a further mechanism in which the centrifugal forces are transferred from a wooden lamination into a hub foot plate by means of steel tension anchors inserted into the wood lamination. This type of structure is not suitable for the relatively slender fiber composite structures of modern supersonic rotor or propeller blades because these profiles are too thin for such steel tension anchors. Adhesion and thermal mismatch problems also would occur.

German Patent Publication (DE-OS) No. 2,832,098 describes yet another mechanism in which the centrifugal forces and bending moments are taken up together by radially extending steel tension anchors. These steel tension anchors are cross connected by shearing bolts which extend perpendicularly through a sandwich type lamination skin of the rotor hub. In such a structure all loads are transmitted from the lamination into the shearing bolts as compression loads and as interlaminar shearing loads. This known load transmission is not advantageous for fiber composites which are better capable of transmitting tension loads. Besides, the known construction does not provide multitude or rather redundant load transmission paths.

Another known unducted Propfan design, disclosed in Aviation Week & Space Technology, Apr. 13, 1987, pp 52–67 and p. 90–93, offers another known solution to the load transfer problem between a carbon fiber composite (CFRP) blade and its retention mechanism.

The blade root is manufactured from titanium metal and comprises an inner titanium spar which extends radially outward into the propeller.

The CFRP composite blade is bonded to this titanium spar like a glove. Thus, all the forces within the CFRP blade are to be transferred through the relatively weak and unreliable bond line, which in itself is prestrained by thermal expansion mismatch (CFRP: $\alpha_T \approx 0\text{-}2*10^{-6}$; Ti: $\alpha_T \approx 10*10^{-6}$ (mm/mm° C.). Some "throw-offs" are known to have occurred.

A further known propfan blade uses an aluminium spar running from root to tip of the propeller blade. The spar is surrounded by a fiberglass composite shell filled with low density material. Though no spar is known to have been lost, foreign object impact has caused severe damage to the shell (Aviation Week & Space Technology, Apr. 13, 1987, pp 78-79).

OBJECTS OF THE INVENTION

In view of the above it is the aim of the invention to achieve the following objects singly or in combination:

to construct a blade for a propeller or rotor in such a way that on the one hand centrifugal forces and on the other hand bending and torsion moments are taken up separately by respective suitable mounting means so that the force introduction or rather force transmission for each load is achived in a way which is advantageous for the fiber composite material;

to make sure that a redundant number of force transmission paths are provided so that upon failure of one mounting means the respective loads are transferred to another mounting means, whereby the blade is prevented from flying off;

the mounting shall be of such a construction that upon impact of foreign bodies on a blade the entire blade cannot tear off, especially the radially inner relatively heavy blade root or blade foot shall remain connected to the rotor hub;

to provide a lightweight construction which takes an optimal advantage of the capabilities of fiber composite materials, especially to take up tension loads; and to make sure that the fibers have to form substantially only one radially inner loop while the free ends of the fibers all extend substantially radially outward without any further loops.

SUMMARY OF THE INVENTION

In the composite blade construction according to the invention, the blade root and the blade body are made of fiber composite material including elongated fiber strands extending substantially radially relative to a rotational axis defined by the rotor hub to which the blade is connected with its blade root. The fibers form loops around mounting elements near the blade root and the radially outer ends of the fiber strands merge in the blade body which may include a body core to which the fiber strands are bonded by the matrix material or by a suitable adhesive interlayer. A jacket covers the blade body and the radially inner end of the jacket forms mounting flanges near the blade root. The mounting flanges extend substantially perpendicular to a radial plane through the blade. These jacket or mounting flanges are secured to respective rims of the rotor hub, for example, by screws. The mounting elements include at least one bolt for securing the blade root to the rotor hub. The loop is formed around the bolt. Preferably, the bolt extends through a shackle and the loop extends around the shackle which carries another beam member or bolts around which further loops are formed or tied.

Advantages of the invention are seen in that the fiber strands which take up the loads caused by centrifugal forces, are exposed substantially only to tensile stress and that the fibers are completely uninterrupted from end to end. As a result, the ability of the fibers to transmit forces can be used to a maximal extent since these forces are all tensile forces. Especially in the radial center of the blade it is now possible to achieve a force introduction in accordance with the abilities of the fibers. This radial center of the blade is connected to the blade root which in turn is secured to the hub.

Loads caused by bending and torsion moments are advantageously taken up primarily by the outer jacket, whereby the mounting flanges have advantageous mechanical features for introducing these loads into the rotor. As a result, the mounting shackle is primarily exposed to tensile stress and disadvantageous load types are prevented from entering into the shackle. The double type of mounting achieved according to the invention by the bolt and/or shackle on the one hand and by the mounting flanges of the outer jacket on the other hand, makes sure that in case of failure of one or the other type of connection, for example, upon contact with a foreign body or when a fatigue failure results, the other type of connection can temporarily take up the loads to which the blade is exposed so that at least the heavy or radially inner portions of the propeller blade will not be torn off. This feature makes sure that only a relatively small lighter outer portion of the blade could be torn off in case of a severe impact by a foreign body, whereby the advantage is achieved that any bursting protection devices for containing fractures can be of a substantially lighter construction than heretofore. Last, but not least, the fiber composite construction according to the invention results in a substantial weight reduction, especially when the blade core is made of materials of low density such as a suitable foam material or light wood with reinforcing ribs.

The above mentioned securing of the mounting flanges of the jacket to the hub rims by means of screws greatly facilitates a simple and rapid attachment of the blades to the rotor hub. However, other suitable means capable of taking up tension stress can be used, for example, clamping straps, V-belts, and similar devices.

According to the invention the tying bolt around which the fiber strands are looped can be oriented either in parallel to the blade profile chord, or perpendicularly thereto. Both possibilities have their advantages. When the longitudinal axis of the tying bolt extends in parallel to the blade profile chord, the bolt or bolts can have a substantial length, thereby permitting an advantageous distribution of the looping fiber loops along the length of the tying bolt. On the other hand, when the longitudinal axis of the tying bolt extends perpendicularly to the blade profile chord, the blade root can be kept rather short as viewed in the circumferential direction of the rotor hub. This feature makes possible a compact arrangement of any propeller adjustment mechanism. Incidentally, the blade profile chord is defined as a thought line extending from leading to trailing edge through the planview of the profile, thus separating the suction side from the compression side.

Another advantageous embodiment of the invention uses a mounting bolt passing through the shackle and into the rotor hub. For this purpose the lower end of the shackle extends into an opening in the rotor hub. The longitudinal axis of the mounting bolt extends in the direction of the blade profile and mounting bolt ends projecting from the shackle are received in holes in the rotor hub. Preferably, the mounting bolt is mounted in two eccentrically located holes in two bushings which in turn are received in the rotor hub. Thus, by rotating the bushings the tightness of the mounting can be adjusted. However, it is also possible that the mounting bolt itself is constructed as a crank to achieve such tightening. This type of connection requires but little space, is simple, and additionally has the double advantage the fibre strands can be prestrained to a tension load sufficient to exclude compression loads which might result from bending and vibration and that the biasing of the fiber strands, or rather the mounting play of the strands enveloping the shackle is adjustable.

By inserting a damping element between the mounting flanges of the jacket and the rotor rims it is possible to damp vibrations that may occur during operation, especially if the center of the damping element is dished to receive and enclose the radially inner end of the shackle with the fiber loop around the shackle. Thus, an additional support or take-up of the reaction forces is achieved simultaneously with the damping. Another advantage of this feature is seen in that the damping element with its central dished portion protects the fiber loop on its radially inwardly facing surface against damages.

By using, in addition to the shackle mounting bolt, at least on loop tie bolt around which the fiber strands are looped, it is possible to arrange the fiber strands in a fan-type pattern, so that individual fiber strands cross one another in an overlapping strength improving relationship. This mutual overlapping assures a good load introduction into the loop tying bolt.

Additionally, it stiffens the blade body against torsion and twisting moments while simultaneously providing a substantial impact strength for the blade body.

The above mentioned blade core is preferably made as a lightweight structure comprising a mulitude of low density wood prisms extending radially, reinforced by shearing strength increasing ribs made of carbon fiber composite material and arranged between neighboring lightweight wood prisms. This type of structure reduces the blade weight as compared to a solid core, and simultaneously increases the bending stiffness of the blade.

According to another advantageous embodiment of the invention, not only the blade body and the blade root are made of fiber composite material, but also the outer jacket and its mounting flanges. This feature further improves the transmission of tensile loads while also reducing the structural weight and improving the connection, not only of the jacket to the hub rim, but also of the jacket to the fiber composite material of the blade body due to an intimate bonding of the laminate plies to one another by the matrix material such as resin when the latter is cured. It is advantageous to use fibers in the outer jacket which have a high modulus of elasticity while the inner fiber strands forming the blade body and looping around the mounting or tying bolts have a lower modulus of elasticity. This type of fiber selection assures a large bending and torsional stiffness while simultaneously making sure that the inner blade body has the required impact strength for an improved resistance against impacts by foreign objects. Preferably, the modulus of elasticity of the fibers forming the jacket is within the range of 235 to 440 GPa, while the modulus of elasticity of the inner fibers is within the range of 65 to 440 GPa. In this connection it is advantageous to increase the modulus of elasticity from the inside out. Thus, in an advantageous further embodiment of the invention in which several fiber strands are used in a multi-ply arrangement, the fibers of the innermost ply have the lowest modulus of elasticity while the fibers of the outermost ply have the highest modulus of elasticity. In this connection it is noted that glass fibers have a modulus of elasticity in the range of 65 to 90 GPa, aramide fibers have a modulus of elasticity within the range of 65 to 108 GPa, while carbon fibers have a modulus of elasticity within the range of 200 to 440 GPa.

By using fibers with a lower modulus of elasticity in the innermost plies, it is assured that the fiber loops are not exposed to tension strain peaks, especially in the inner plies, thereby preventing a premature blade failure. Furthermore, this feature assures a smooth transition between the stiff outer layers and the inner layers or plies of lesser stiffness so that abrupt stiffness changes are avoided which is advantageous for the bending properties of the entire blade. It is also desirable to properly select the heat expansion coefficient of the fiber strands so that a stepwise adaptation of the heat expansion of the inner strands to the heat expansion of the outer strands is achieved.

It is advantageous to arrange the fiber strand loops in groups and to separate neighboring groups from one another by radially extending lateral strand retaining elements for holding the fiber strand groups against lateral displacement. These lateral retaining elements make sure that axially effective forces in the blade foot zone cannot damage the fiber loop layers. They also prevent crack propagation from one loop to the others. Thus, the lateral retaining elements prevent a premature failure of the present blade construction and create redundancy.

It is preferred, according to the invention to construct the outer jacket and the mounting flanges of the outer jacket by using carbon fiber composite material having, as mentioned, a modulus of elasticity within a medium to high range. Preferably glass fibers should be used for innermost fiber strand layers. Intermediate layers should be made of fibers having an intermediate modulus of elasticity such as p, p'-aramide fibers having a high tension strength and tenacity. The next layer located still further outwardly should be made of carbon fibers having a modulus of elasticity in an intermediate range to provide a gradual transition to the outer jacket also made of carbon fibers, but of the higher modulus of elasticity range. Carbon fibers are especially suitable for the outer jacket due to the high stiffness and low density of these carbon fibers, but a compromise has to be found between necessary stiffness and impact toughness properties.

BRIEF DESCRIPTION OF THE DRAWINGS

In order that the invention may be clearly understood, it will now be described, by way of example, with reference to the accompanying drawings, wherein:

FIG. 1 is a somewhat simplified plan view of a blade according to a first embodiment of the invention with the blade root portion shown in section;

FIG. 2 is a sectional view approximately along section line 2—2 in FIG. 1;

FIG. 3 is an enlarged view of the blade root area, partially in section parallel to the blade profile chord, illustrating a shackle, a mounting bolt and a tie bolt for securing the blade and fiber strands to a rotor member;

FIG. 4 is a sectional view along section line 4—4 in FIG. 3;

FIG. 5 illustrates a view similar to that of FIG. 1, but showing a second embodiment according to the invention in which fiber layer strands are arranged in overlapping groups;

FIG. 6 is a sectional view along section line 6—6 in FIG. 5;

FIG. 7 shows a view similar to that of FIGS. 1 and 5, but illustrating a third embodiment of the invention in which the fibers are arranged in overlapping radiationg patterns;

FIG. 8 is a view partially in section, substantially along section line 8—8 in FIG. 7;

FIG. 9 is an enlarged view, partly in section of the shackle used in the embodiment of FIGS. 7 and 8;

FIG. 10 is a sectional view along section line 10—10 in FIG. 9;

FIG. 11 is a schematic view similar to that of FIGS. 1, 5, and 7, but showing a fourth embodiment with a single bolt around which the fibers are looped and which also functions as a mounting bolt for securing the blade to a rotor hub member;

FIG. 12 is a sectional view substantially along section line 12—12 in FIG. 11;

Figure 13:
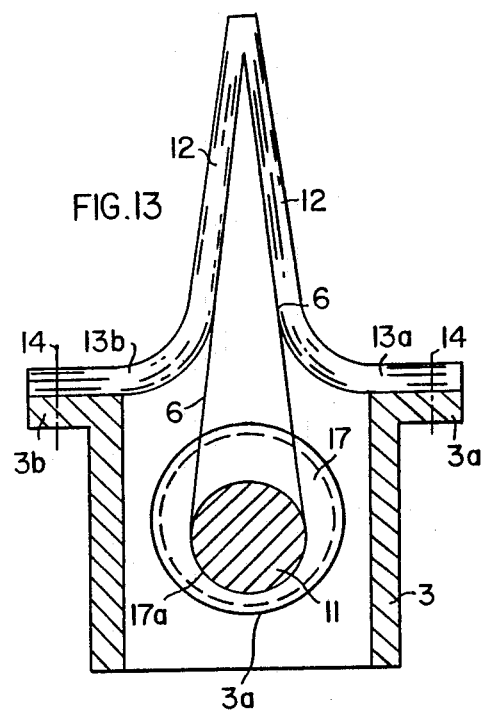
FIG. 13 is an enlarged sectional view through the blade root zone illustrating an adjustable mounting of a mounting bolt in an opening of a rotor hub for avoiding play between the blade root and the rotor hub.

DETAILED DESCRIPTION OF PREFERRED EXAMPLE EMBODIMENTS AND OF THE BEST MODE OF THE INVENTION

Referring to FIGS. 1 and 2 illustrating a first embodiment of the invention a propeller blade 1 having a body 2 constructed of fiber composite material as taught herein, is secured with its blade root 2' to a rotor hub member 3. The hub member 3 is part of a rotor of a prop-fan propulsion plant not shown. The blade body 2 comprises, as seen in FIG. 2, a wedge-shaped blade core 4 made of lightweight material, as will be described in more detail below. Groups 5, 6, and 7 of fiber strands envelope the blade core 4. The hub member 3 defines a rotational axis which extends horizontally in the plan defined by the drawing sheet of FIG. 1. In FIG. 2 the rotational axis extends perpendicularly to the sheet of the drawing. The groups 5 and 7 of fiber strands are located axially outside a central or intermediate group 6 of fiber strands. The axially outer groups 5, 7 of fiber strands form loops around ends 8, 9 of a tie bolt mounted in the blade root 2'. The central group 6 of fiber strands loops around a shackle 10. All fiber ends outside the loop forming zone extend substantially radially outwardly, however the fiber ends may overlap as will be described below.

Referring further to FIGS. 1, 2, 3, and 4 the tie bolt T with its ends 8 and 9 is secured to the shackle 10 as best seen in FIG. 3. The shackle 10 in turn is attached to the hub member 3 by a mounting bolt 11 passing through a first bore 10a in the lower or radially inner shackle end 10b. The tie bolt T passes through a second bore 10d in the radially outer end 10c of the shackle 10 in such a way that the loops of the strand groups 5 loop around the bolt end 8 and the loops of the strand groups 7 loop around the bolt end 9. The bolt 11 holds the shackle 10 rigidly in the radial direction, but permits the shackle 10 to swivel about the axis of the botl 11. FIG. 4 shows that the core 4 sits on the top radially outer surface of the shackle 10. Rather than constructing the tie bolt T and the shackle 10 as two separate components, the tie bolt can be formed as an integral part of the radially outer end 10c of the shackle 10 with the ends 8 and 9 still projecting from the shackle as shown. Both embodiments connect the tie bolt T with its ends 8, 9 radially rigidly to the hub member 3 through the shackle 10.

As best seen in FIG. 2, the central group 6 of fiber strands loops around the radially inner end 10b of the shackle 10. As best seen in FIG. 1, the groups 5 and 7 loop around the tie bolt ends 8 and 9. With this distribution of the fiber strands, fiber layers may be formed substantially along the entire axial length of the tie bolt with its ends 8 and 9. Such substantially uninterrupted fiber layers assure an efficient and for the fiber characteristics advantageous introduction of reaction forces into the rotor hub 3.

According to the invention the fiber strand groups 5, 6, and 7 are enclosed by an outer jacket 12 which may or may not be formed of fiber composite material. In both instances the outer jacket 12 will envelop the entire blade outside hub 3. The radially inner ends of the jacket 12 are formed as mounting flanges 13a, 13b which are rigidly secured to respective rims, 3a, 3b of the rotor hub member 3, for example, by threaded bolts 14 merely shown symbolically.

This type of construction permits a rapid and easy mounting because the bolts 14 merely need to be screwed into respective threaded holes and the bolt 11 can be easily pushed through the rotor hub member 3 and the shackle 10. Disassembly is equally simple.

The jacket 12 merges with a curved portion into its mounting flanges 13a and 13b, thereby forming a bending spring which provides an advantageous load distribution of the bending and torsional forces effective on the blade and to be introduced into the hub member 3. Should fiber loops 5, 6 and 7 fail, this flange provides also for a secondary load path for the centrifugal forces.

Radially extending lateral flanges 18 are provided at the outer ends of the strand loops 5 and 7 as well as between the strand loops 5 and 6 and 6 and 7 respectively. These flanges 18 make sure that the fiber strand loops are held in place and that premature failures of the fiber loops due to compression forces which are effective in the axial direction of the tie bolt 8, 9, are avoided.

FIGS. 5 and 6 show a second embodiment of a fiber composite blade structure according to the invention having a blade body 2a in which the fiber strand groups 5, 6, and 7 are arranged in a mutually overlapping pattern for an improved torsional and impact strength. The tie bolts 8a and 9a extend in the direction of the blade profile chord. The fiber strands of the central group 6 extend approximately radially outwardly and envelop the blade core 4. The fiber strands of the axially outer strand groups 5 and 7 have an fan-type configuration so that alternate fiber layers overlap each other.

FIG. 6 shows the details of a damping member 16 having a central dished portion 16a surrounding and at least partially enclosing the lower or radially inner end of the shackle 10 inside an opening of the rotor hub member 3. The central dished portion 16a of the damping member 16 is shaped to hug the lower end of the fiber strands 6 looping around the shackle 10 for an effective damping of vibrations. Preferably, the damping member 16 is made of a polyurethane elastomer. The dished portion 16a is surrounded by a ring portion which is received between the rims 3a and 3b of the hub member 3 on the one hand and the flanges 13a and 13b of the jacket 12 on the other hand. Additionally, FIG. 6 shows clamping plates or angles 15a and 15b which enclose the mounting flanges 13a and 13b and through which the threaded bolts 14 extend. The clamping plates 15a and 15b improve the introduction of the reaction forces caused by the bending, the torsional and the centrifugal forces, respectively into the mounting flanges 13a and 13b and thus into the rotor member 3.

FIG. 6 further shows that the outer jacket 12 is itself enveloped by an outer skin 12a made of an erosion resistant material such as a rain erosion resistant paint system. Additionally, the leading edge may comprise an abrasion and erosion resistant adhesive filmtape, or a metallic erosionstrip.

FIG. 5 further shows the above mentioned substantially radially extending lateral flanges 18 which separate the individual groups of fiber strands 5, 6, and 7, at least in the blade root region.

FIGS. 7, 8, 9, and 10 illustrate still another embodiment of the invention in which a blade body 2b is formed of fiber strands or rather groups of fiber strands 5, 6, and 7. The fibers of groups 5, 7, radiate away from tie bolts 8', 9' respectively. The fibers of these tie groups 5 and 7 loop around these bolts 8' and 9'. On the other hand, the fibers of the group 6 loop around a shackle member 20 shown in more detail in FIGS. 9 and 10. The shackle member 20 has a radially inner section 20a reaching into a radial opening of the rotor hub not shown in FIGS. 7, 8, 9, and 10. The radially inner section 20a has a bore 20b through which the mounting bolt 11 extends as described above with reference to FIGS. 1 to 4. The shackle member 20 has a radially outer section 20c with a central saddle on which the core 4 may rest and two arms 20d and 20e extending substantially or approximately axially away from the saddle in opposite directions. Each arm 20d and 20e has either lateral lobes with holes through which the tie bolts 8' and 9' extend, or lateral lobe from which the tie bolts 8' and 9' protude, if shackle 20 and the tie bolts are constructed as a one-piece part or integral component.

As seen in FIG. 8, fiber and matrix material accumulations 7' appear near the tie bolts 9'. The same accumulation occurs near the tie bolt 8' which is not seen in FIG. 8. These material accumulations are advantageous since they reinforce the blade near its root, expecially in a direction perpendicularly to the surface of the blade, where the bending stresses resulting from bird strike impact would be the highest. The outer jacket 12 is omitted for clarity, but it is understood to be apart of this embodiment as well. FIGS. 11 and 12 show still another embodiment in which a blade body 2c is reinforced by a central loop of fiber strands 6 which loop around a bolt 11a which simultaneously functions as a mounting bolt in the hub member 2 and as a tie bolt for fiber loop 6. The outer jacket 12 is formed in the same manner as described above and the flanges 13a, 13b are also secured as described to the hub rims 3a and 3b.

FIG. 13 shows a means for adjusting the position of the mounting bolt 11 relative to the hub member 3. An eccentricity may be provided either in the bolt 11, in which case it would function as a cam or, preferrably, the eccentricity can be provided in two bushings 17 having an eccentric bore 17a in which the mounting bolt 11 is recieved. The bushings 17 are in turn received in a bore 3c of the hub member 3. Thus, by rotating the bushings 17 the bias of the fibre strands relative to the hub member 3 can be adjusted to a defined desired biasing of the fibers relative to the hub. Additionally, any play between the hub rims 3a and 3b on the one hand, and the mounting flanges 13a and 13b can be eliminated. The main intention, however, is to prestrain the fiber groups 5, 6, 7 so, that they should be purely tension loaded to enhance fatigue life, if the blade vibrates in normal operation. In the shown position of the bolt 11 relative to the adjusting bushing 17, a maximum bias is applied to the fibre strands 6. The bushing 17 is threaded into bore 3c.

Figure 14:
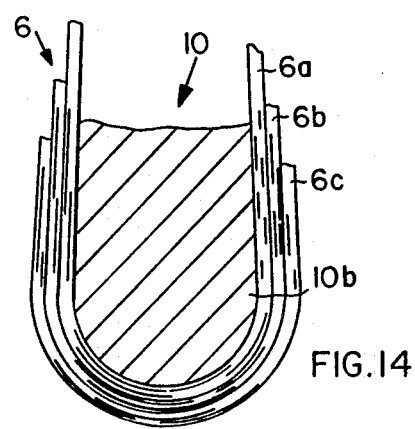
FIG. 14 is a sectional view, on an enlarged scale, showing the fiber loops arranged in several plies around the tie bolt.

FIG. 14 shows, on an enlarged scale, the radially inner end 10b of a shackle 10 with the fiber strands 6 arranged in three layers 6a, 6b, and 6c. The layer 6a should have fibers of the lowest modulus of elasticity. The layer 6b should have fibers having a modulus of elasticity in an intermediate range. The fibers 6c should have a modulus of elasticity in the highest range. Thus, the modulus of elasticity should increase from the inside out. The same principle may be used in fibre loops 5 and 7.

Figure 15:
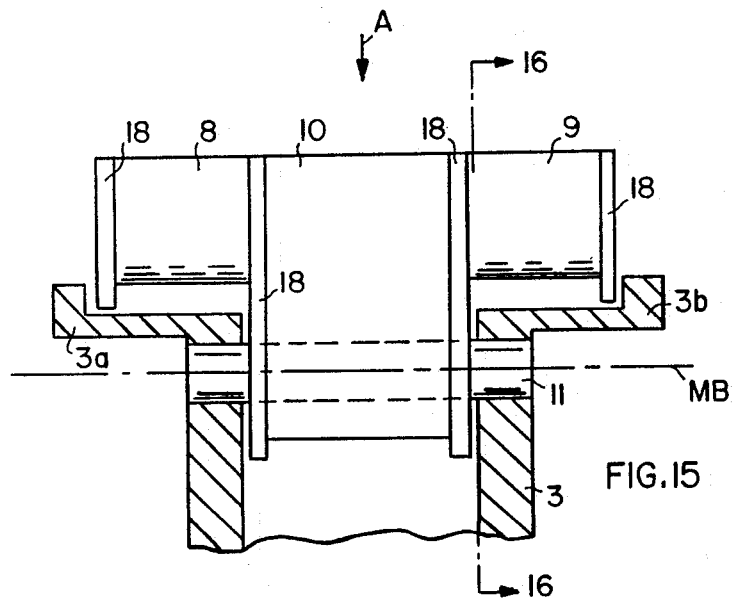
FIG. 15 is a view similar to FIG. 3 showing another version of a shackle member.
Figure 16:
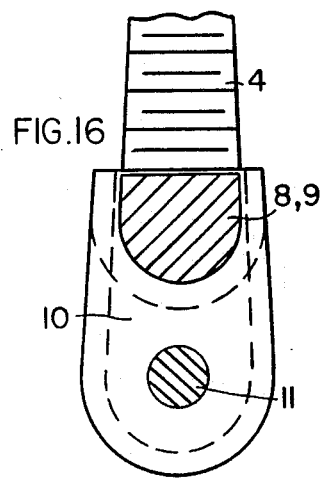
FIG. 16 is a sectional view along section line 16—16 in FIG. 15.
Figure 17:
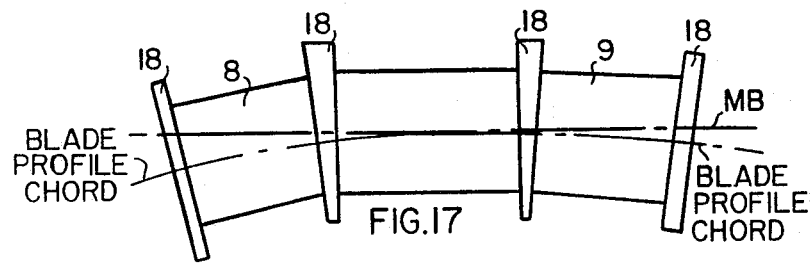
FIG. 17 is a view top view in the direction of the arrow A of a shakle as shown in FIG. 15.

FIGS. 15, 16 and 17 show a modified mounting and tie bolt construction, i.e. an integral shackle member, especially for use in the embodiment shown in FIGS. 5 and 6. Hence, the same reference numbers have been used as in FIGS. 5 and 6. FIG. 17 shows that the axis of the integral tie bolts T with the ends 8, 9 does not extend in parallel to the axis MB of the mounting bolt 11. Rather, the axis of the tie bolt T coincides with the blade profile chord.

Although the invention has been described with reference to specific example embodiments, it will be appreciated that it is intended to cover all modifications and equivalents within the scope of the appended claims.

What is claimed is:

1. A composite blade construction, comprising a blade root for connection to a rotor hub defining a rotational axis, mounting means for securing said blade root to said rotor hub, a blade body integrally secured to said blade root, said blade body and said blade root comprising fiber composite material including elongated fiber strands extending substantially radially relative to said rotational axis and forming fiber loops around said mounting means, said fiber strands merging with their radially outer ends into said blade body, jacket means covering said blade body, said jacket means comprising mounting flanges formed at a radially inner end of said jacket means near said blade root, said mounting flanges extending substantially perpendicularly to a radial blade plane, means for securing said mounting flanges to a respective rim of said rotor hub, and wherein said mounting means comprise a shackle member having a radially inner end reaching into a radial opening of said rotor hub, said radially inner shackle end having a through-bore extending substantially in parallel to said rotational axis, a mounting bolt extending through said through-bore, said mounting bolt having ends protruding from said first bore into respective bores of said rotor hub for securing said radially inner shackle end to said rotor hub, and tie means having tie ends projecting from a radially outer shackle end for holding a respective group of fiber loops.

2. The composite blade construction of claim 1, wherein said fiber strands form a central fiber strand group looping around said radially inner shackle end, and two lateral fiber strand sections looping around said tie bolt ends of said tie bolt.

3. The composite blade construction of claim 1, wherein said radially outer end of said shackle member has a further through-bore, said tie means comprising a tie bolt extending through said further through-bore in parallel to a chord through said blade body or in the direction of said chord.

4. The composite blade construction of claim 1, wherein said radially outer end of said shackle member comprises a central saddle and two arms extending substantially axially away from said central saddle in opposite directions, said tie means including tie bolts in said two shackle arms, said tie bolts holding respective fiber loops.

5. The composite blade construction of claim 4, wherein said two shackle arms comprise bore means, said tie bolts extending through said bore means and substantially tangentially to a circle having its center in said rotational axis and defining a plane extending radially and perpendicularly to said rotational axis, whereby said tie bolts (8, 9, ) extend substantially perpendicularly of a chord through said blade body.

6. The composite blade construction of claim 1, wherein said mounting means for securing said blade root to said rotor hub further comprise eccentric means for adjusting said mounting bolt in its position relative to said rotor hub.

7. The composite blade construction of claim 6, wherein said eccentric means comprise an externally threaded bushing with an eccentric hole in which said mounting bolt is received, said bushing being adjustably mounted in said rotor hub.

8. The composite blade construction of claim 6, wherein said eccentric means are part of said mounting bolt.

9. The composite blade construction of claim 1, further comprising vibration damping means (16) operatively arranged between said mounting flanges of said jacket jacked means and said rim of said rotor hub, said vibration damping means having a central dished section surrounded by a ring section, said central dished section having a contour for at least partially enclosing said mounting means which secure the blade root to the rotor hub.

10. The composite blade construction of claim 1, wherein said fiber strands comprise a plurality of fiber strand groups arranged in fan-type patterns which at least partially overlap one another.

11. The composite blade construction of claim 1, wherein said blade body comprises a blade core (4) of shear resistant, lightweight construction, said blade core having a radially inner end resting on said mounting means securing said blade root to said rotor hub.

12. The composite blade construction of claim 1, wherein said jacket means including said mounting flanges are made of fiber reinforced synthetic material.

13. The composite blade construction of claim 12, wherein said fiber reinforced synthetic material of said jacket means comprise fiber types having a high modulus of elasticity within the range of about 235 to about 440 GPa, and wherein said elongated fiber strands of said fiber composite material comprise fiber types having a modulus of elasticity within the range of about 65 GPa to about 440 GPa.

14. The composite blade construction of claim 13, wherein said elongated fiber strands comprise a plurality of layers of fiber strands, wherein fiber types of said strands are so selected that the modulus of elasticity in the longitudinal fiber direction increases from an inwardly located fiber strand layer to an outwardly located fiber strand layer.

15. The composite blade construction of claim 1, wherein said mounting flanges of said jacket means have a curved portion merging into said jacket means, whereby said mounting flanges form a bending spring.

16. The composite blade construction of claim 15, wherein said mounting flanges of said jacket means comprise a plurality of fiber layers, said fiber layers having at least one intermediate fiber layer with a relatively low modulus of elasticity within the range of about 60 to 180 GPa.

17. The composite blade construction of claim 15, wherein said jacket means (12) including said mounting flanges (13) are made substantially of carbon fiber reinforced composite material comprising carbon fibers embedded in a resin matrix, and wherein said jacket means include an erosion protective outer coating made of a polyurethane laquer or a polyurethane elastomer film.

18. The composite blade construction of claim 1, wherein said elongated fiber strands form layers of glass fibers, of p,p'-aramide fibers, and of carbon fibers respectively embedded in a matrix material.

19. The composite blade construction of claim 1, wherein said fiber strands are arranged in fiber strand loops, said blade construction further comprising lateral retaining elements (18) for holding said fiber strand loops against lateral displacement.

20. The composite blade construction of claim 1, wherein said tie means comprise a tie bolt forming an integral part of said mounting shackle member, said tie bolt having bolt ends projecting out of said shackle member at opposite sides thereof.

21. The composite blade construction of claim 4, wherein said tie bolts and said shackle member form an integral component.

* * * * *

UNITED STATES PATENT AND TRADEMARK OFFICE
CERTIFICATE OF CORRECTION

PATENT NO. : 4,966,527

DATED : October 30, 1990

INVENTOR(S) : Herbert Merz

It is certified that error appears in the above-identified patent and that said Letters Patent is hereby corrected as shown below:

Claim 5, line 7, column 11, line 32, replace "(8, 9,)" by --(8', 9')--;

Claim 9, line 4, column 11, line 50, delete "jacked";

Claim 17, line 7, column 12, line 40, replace "laquer" by --lacquer--, replace "elastomer" by --elastomeric--.

Signed and Sealed this

Eighteenth Day of February, 1992

Attest:

HARRY F. MANBECK, JR.

*Attesting Officer*  *Commissioner of Patents and Trademarks*